US012783236B2

(12) United States Patent
Recktenwald et al.

(10) Patent No.: US 12,783,236 B2
(45) Date of Patent: Nov. 3, 2026

(54) SYNCHRONOUS HARDWARE ACCELERATOR INTERFACE

(71) Applicant: INTERNATIONAL BUSINESS MACHINES CORPORATION, Armonk, NY (US)

(72) Inventors: Martin Recktenwald, Schoenaich (DE); Christian Jacobi, West Park, NY (US); Brenton Belmar, New Paltz, NY (US); Christian Borntraeger, Stuttgart (DE); Ulrich Weigand, Tuebingen (DE); Gregory William Alexander, Pflugerville, TX (US); Jonathan D. Bradbury, Poughkeepsie, NY (US); Christian Gerhard Zoellin, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/897,127

(22) Filed: Sep. 26, 2024

(65) Prior Publication Data

US 2026/0086802 A1 Mar. 26, 2026

(51) Int. Cl.
*G06F 9/30* (2018.01)

(52) U.S. Cl.
CPC ...... *G06F 9/30043* (2013.01); *G06F 9/30087* (2013.01)

(58) Field of Classification Search
CPC .................................................. G06F 9/30043
See application file for complete search history.

(56) References Cited

U.S. PATENT DOCUMENTS 8,127,113 B1 * 2/2012 Sinha ........................ G06F 9/54 712/34
11,907,718 B2 2/2024 Vanesko et al.
2005/0219251 A1 * 10/2005 Chun .................. G06F 9/30181 345/503
2012/0239904 A1 9/2012 Ekanadham et al.
2013/0080672 A1 * 3/2013 Tal .......................... G06F 9/526 710/200
2014/0075449 A1 * 3/2014 Du .......................... G06F 9/522 718/106
2014/0189333 A1 7/2014 Ben-Kiki et al.
(Continued)

OTHER PUBLICATIONS

Anonymous, "System and Method for Software Debug using Fast CacheSimulation by Separation of Data and Tag Views", IP.com Prior Art Database Technical Disclosure, Nov. 15, 2021, 18 pages, IPCOM000267673D.

(Continued)

*Primary Examiner* — Michael J Metzger
(74) *Attorney, Agent, or Firm* — Edward Wixted, Esq.; Kevin P. Radigan, Esq.; Heslin Rothenberg Farley & Mesiti P.C.

(57) ABSTRACT

Operation of an accelerator of a computing environment is invoked based on storing data to be used by the accelerator in a selected location. The storing of the data in the selected location signals to the accelerator that a task is to be performed by the accelerator. Status of the task performed by the accelerator is obtained, and at least one action is performed based on obtaining the status of the task performed by the accelerator.

25 Claims, 7 Drawing Sheets

(56) References Cited

U.S. PATENT DOCUMENTS

| | | | | |
|---|---|---|---|---|
| 2017/0091118 | A1* | 3/2017 | Mari | G06F 12/0815 |
| 2017/0249179 | A1* | 8/2017 | Tsirkin | G06F 9/45558 |
| 2018/0284994 | A1* | 10/2018 | Haller | G06F 12/0292 |
| 2020/0133721 | A1* | 4/2020 | Sasaki | G06F 9/30101 |
| 2020/0364088 | A1 | 11/2020 | Ashwathnarayan et al. | |
| 2020/0394495 | A1* | 12/2020 | Moudgill | G06N 3/048 |
| 2021/0400187 | A1* | 12/2021 | Kale | G06F 17/16 |
| 2022/0308879 | A1 | 9/2022 | Rusitoru et al. | |
| 2023/0037780 | A1 | 2/2023 | Goveas | |
| 2023/0393851 | A1* | 12/2023 | Wang | G06F 9/30181 |
| 2024/0272941 | A1* | 8/2024 | Dragojevic | G06F 9/544 |

OTHER PUBLICATIONS

Anonymous, "Fast Emulation of Computing Systems Using Processors with Attached Accelerators", IP.com Prior Art Database Technical Disclosure, Feb. 21, 2020, 5 pages, IPCOM000261315D.

Anonymous, "Method for Handling Page Boundary Crossings Encountered by a Hardware Accelerator", IP.com Prior Art Database Technical Disclosure, Sep. 24, 2010, 6 pages, IPCOM000200051D.

Anonymous, "System for representing and executing heterogeneous threads of an application in a hybrid computing system", IP.com Prior Art Database Technical Disclosure, Jan. 6, 2010, 18 pages, IPCOM000191510D.

Sang-Woo Jun, "CS152: Computer Systems Architecture The Hardware/Software Interface", Spring 2023 (no further date information available), 23 pages, University of California.

ISA, "The Hardware—Software Interface", 2017-2018 (no further date information available), 23 pages.

Thierry Moreau et al. "A Hardware-Software Blueprint for Flexible Deep Learning Specialization", IEEE, Sep./Oct. 2019, pp. 9-16. IEEE Micro.

Yuka Ikarashi et al. "Exocompilation for Productive Programming of Hardware Accelerators", PLDI '22, Jun. 13-17, 2022, pp. 703-718, San Diego, CA.

IBM, "z/Architecture Principles of Operation," IBM Publication No. SA22-7832-13, Fourteenth Edition, May 2022, pp. 1-2124.

Abali B. et al., "Data Compression Accelerator on IBM Power9 and z15 Processors : Industrial Product," 2020 ACM/IEEE 47th Annual International Symposium on Computer Architecture (ISCA), Valencia, Spain, May 30, 2020, 14 pages, doi: 10.1109/ISCA45697.2020.00012.

International Searching Authority, "Notification of Transmittal of the International Search Report and the Written Opinion of the International Searching Authority, or Declaration," Patent Cooperation Treaty, Dec. 18, 2025, 14 pages, International Application No. PCT/EP2025/076292.

* cited by examiner

SYNCHRONOUS HARDWARE ACCELERATOR INTERFACE

BACKGROUND

One or more aspects relate, in general, to facilitating processing within a computing environment, and in particular, to facilitating accelerator processing within the computing environment.

Modern processors often support general-purpose instructions, as well as a variety of dedicated hardware accelerators. Typically, the accelerators perform specialized tasks considerably faster than using general-purpose instructions. Examples of such specialized tasks include executing cryptographical algorithms, such as Advanced Encryption Standard (AES) algorithms, or compression/decompression algorithms, such as Deflate.

One programming model used by software, such as applications, includes accessing the accelerators synchronously to program execution. For example, an application initiates execution of a specific-purpose instruction that starts the accelerator operation, and once the accelerator operation ends, the instruction finishes.

Adding an actual new instruction for accelerator access, however, requires modification of the existing instruction set. In the presence of many hardware accelerators, some of them possibly experimental and short-lived, extending the set of instructions in a given instruction set architecture may not be desirable.

SUMMARY

Shortcomings of the prior art are overcome, and additional advantages are provided through the provision of a computer program product. The computer program product includes a set of one or more computer-readable storage media and program instructions, collectively stored in the set of one or more computer-readable storage media, for causing at least one computing device to perform computer operations. The computer operations include invoking operation of an accelerator of a computing environment based on storing data to be used by the accelerator in a selected location. The storing of the data in the selected location signals to the accelerator that a task is to be performed by the accelerator. Status of the task performed by the accelerator is obtained, and at least one action is performed based on obtaining the status of the task performed by the accelerator.

In one or more aspects, a computer program product is provided that includes a set of one or more computer-readable storage media, and program instructions, collectively stored in the set of one or more computer-readable storage media, for causing a hardware accelerator to perform computer operations. The computer operations include determining, by the hardware accelerator, that it is being invoked by a computing device coupled to the hardware accelerator. The determining being based on data to be used by the hardware accelerator being stored in a selected location. The storing of the data in the selected location signals to the hardware accelerator that a task is to be performed by the accelerator. The hardware accelerator, based on being invoked, performs the task using the data stored in the selected location. The hardware accelerator provides status of the task performed by the hardware accelerator.

Computer program products, computer systems and computer-implemented methods relating to one or more aspects are described and claimed herein. Each of the embodiments of the computer program product may be embodiments of each computer system and/or each computer-implemented method and vice-versa. Further, each of the embodiments is separable and optional from one another. Moreover, embodiments may be combined with one another. Each of the embodiments of the computer program product may be combinable with aspects and/or embodiments of each computer system and/or computer-implemented method, and vice-versa. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
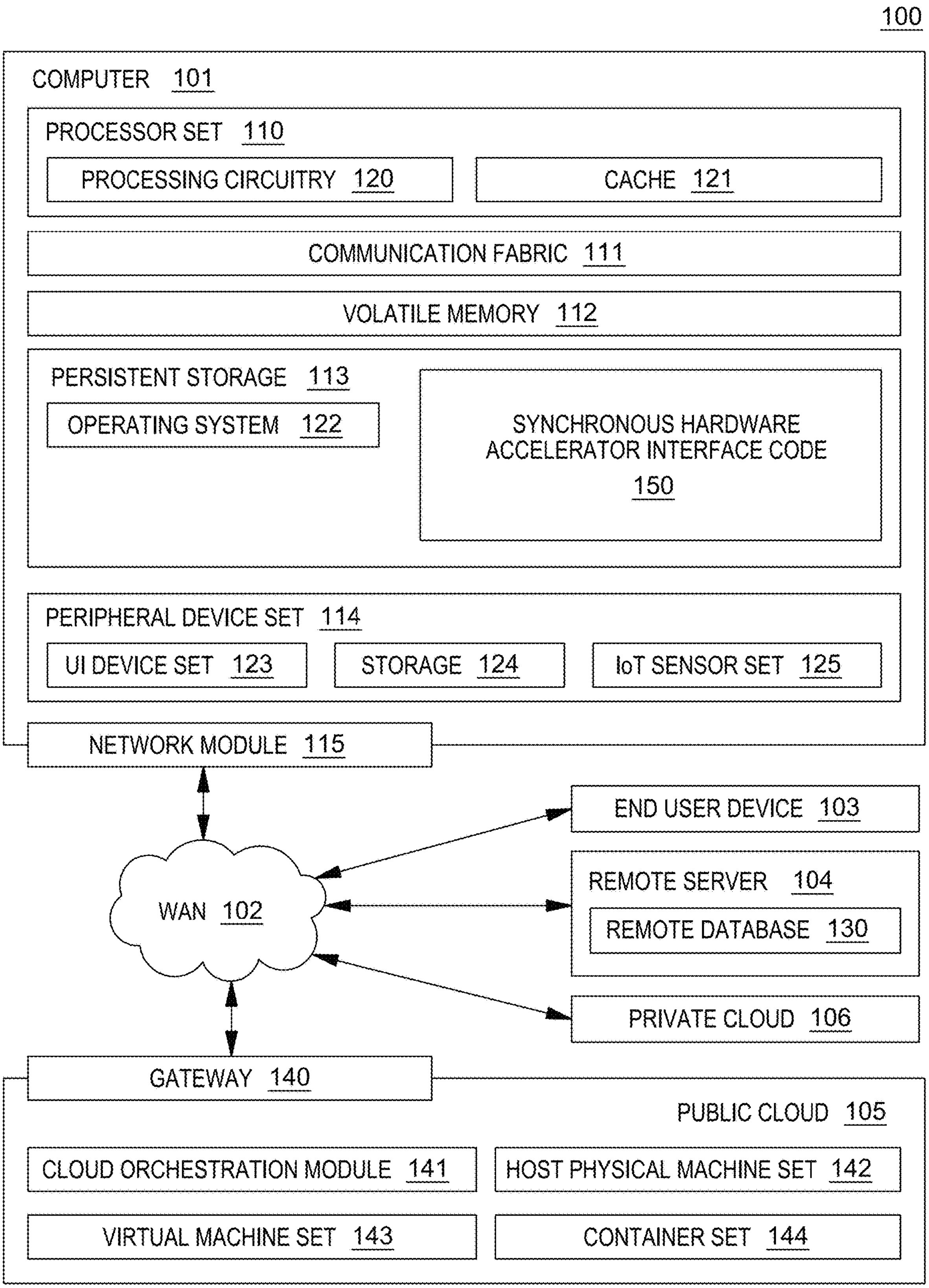
FIG. 1 depicts one example of a computing environment to incorporate and use one or more aspects of the present disclosure.

In accordance with one or more aspects, a capability is provided to facilitate processing within a computing environment. In one or more aspects, the capability includes facilitating synchronous accelerator processing. In one example, an interface, such as a hardware/software interface, is provided that enables a synchronous programming model without having to change the instruction set architecture to add new instructions or modify existing instructions for synchronous accelerator processing. Thus, the interface enables synchronous accelerator processing absent changing the instruction set architecture to add new instructions or modify existing instructions.

In one or more aspects, a selected location is identified as an interface for invoking an accelerator (e.g., a hardware accelerator). For example, the selected location is a virtual memory location in the application's virtual memory space that is identified as an interface for accelerator hardware. In one example, an application sets up a parameter block (also referred to herein as an accelerator parameter block) in its own virtual memory space and an existing instruction, unmodified for synchronous accelerator processing, is used (e.g., by the application) to store parameter block information (e.g., an address of the parameter block, such as a virtual memory location, other address, etc., and/or contents of the parameter block) to the selected location. This invokes operation of the accelerator to perform a task (e.g., encrypt/decrypt data; other cryptographic operations; compress/decompress data; other operations; other types of tasks; etc.) and program execution is stalled until the accelerator operation is complete. That is, the accelerator operation is synchronous to the execution of the store operation.

In one or more aspects, the accelerator provides status of its operation. For instance, it places status relating to the task being performed in one or more other selected locations (e.g., the selected location, a status register, another location, etc.). The status is then read. For instance, the status of the operation is read by the application (e.g., using an existing, unmodified for synchronous accelerator processing, load instruction or other existing, unmodified for synchronous accelerator processing, instruction that performs a load operation).

In one example, the operations of storing the parameter block information and loading the status (e.g., from the same location (e.g., address) or a different location) can be combined in an atomic store/load operation or instruction, such as a compare and swap instruction or another instruction that can atomically perform store and load operations.

Adding/using many different accelerators can be achieved by providing more selected locations (e.g., memory locations) for the accelerator interfaces. No new instructions are needed that would impact the existing instruction set architecture.

One or more aspects also provide a low-overhead solution to resolve page faults on memory locations accessed by the accelerator.

In one or more aspects, a computer program product is provided. The computer program product includes a set of one or more computer-readable storage media, and program instructions, collectively stored in the set of one or more computer-readable storage media, for causing at least one computing device to perform computer operations. The computer operations include invoking operation of an accelerator of a computing environment based on storing data to be used by the accelerator in a selected location. The storing of the data in the selected location signals to the accelerator that a task is to be performed by the accelerator. Status of the task performed by the accelerator is obtained, and at least one action is performed based on obtaining the status of the task performed by the accelerator. Use of an accelerator increases processing speed for tasks performed by the accelerator rather than using general-purpose instructions. Invoking the accelerator by storing data in a selected location provides a streamlined procedure for invoking the accelerator and eliminates the need to generate new specialized instructions and/or to modify existing instructions to invoke the accelerator and/or perform processing with the accelerator.

Additionally, or alternatively, in one example, invoking the operation and performing the task by the accelerator are performed synchronously. A synchronous programming model is provided that does not require changing the instruction set architecture to add new instructions or modify existing instructions to perform the synchronous accelerator processing.

Additionally, or alternatively, in one example, the selected location is a memory location addressed by a virtual address used by an application to store the data. Virtual memory and virtual addressing is able to be used by the accelerator processing, facilitating the use of memory and processing within the computing environment.

Additionally, or alternatively, in one example, storing the data in the selected location and obtaining the status include executing an instruction that atomically performs the storing of the data in the selected location and the obtaining the status. Atomically performing the storing of the data and obtaining the status simplifies handling of interrupts and multiprocessing scenarios, facilitating processing and improving performance.

Additionally, or alternatively, in one example, the instruction is a compare and swap instruction and based on executing the compare and swap instruction: the data is stored in the selected location and based on the accelerator performing the task using the data that is stored in the selected location, the status is loaded into another selected location. Atomically performing the storing of the data and obtaining the status, using the compare and swap instruction, simplifies handling of interrupts and multiprocessing scenarios, facilitating processing and improving performance.

Additionally, or alternatively, in one example, storing the data in the selected location includes executing a store instruction to store the data in the selected location. The selected location is a memory location. This facilitates signaling the accelerator to perform a task. Using the memory location simplifies the signaling while providing data useful in performing the task. This improves processing.

Additionally, or alternatively, in one example, obtaining the status includes executing a load instruction to obtain the status. Using the load instruction facilitates the synchronous processing by indicating when the accelerator has completed processing signifying that other work may be performed by the computing device waiting for status from the accelerator.

Additionally, or alternatively, in one example, the data stored in the selected location includes an address of a parameter block, and contents of the parameter block are related to the task to be performed by the accelerator. This facilitates processing by providing an address to the data to be used by the accelerator in the location used to signal the accelerator that a task is to be performed by the accelerator.

Additionally, or alternatively, in one example, storing the data includes storing contents of a chosen location in the selected location. The contents of the chosen location include parameter block information to be used by the accelerator to perform the task. This facilitates processing by providing the data to be used by the accelerator in the location used to signal the accelerator that a task is to be performed by the accelerator.

Additionally, or alternatively, in one example, the chosen location includes a register storing the parameter block information, and the selected location includes a memory location. This facilitates processing by providing the data to be used by the accelerator in the location used to signal the accelerator that a task is to be performed by the accelerator.

Additionally, or alternatively, in one example, the parameter block information includes contents of a parameter block, and the contents of the parameter block are related to the task to be performed by the accelerator. This facilitates processing by providing the data to be used by the accelerator in the location used to signal the accelerator that a task is to be performed by the accelerator.

Additionally, or alternatively, in one example, the parameter block information includes an address of a parameter block, and contents of the parameter block are related to the task to be performed by the accelerator. This facilitates processing by providing an address of the data to be used by the accelerator in the location used to signal the accelerator that a task is to be performed by the accelerator.

Additionally, or alternatively, in one example, the status includes a failing address. The failing address indicates a page fault. This facilitates processing by providing an indication of where the error, e.g., page fault was detected.

In accordance with one or more aspects, each of the embodiments is separable and optional from one another. Further, embodiments may be combined with one another.

In one or more aspects, a computer program product is provided (and/or a computer system and/or a computer-implemented method). The computer program product includes a set of one or more computer-readable storage media, and program instructions, collectively stored in the set of one or more computer-readable storage media, for causing at least one computing device to perform computer operations. The computer operations include invoking operation of an accelerator of a computing environment based on storing data to be used by the accelerator in a selected location. The selected location is a memory location addressed by a virtual address used by an application to store the data. The storing of the data in the selected location signals to the accelerator that a task is to be performed by the accelerator. Status of the task performed by the accelerator is obtained, and at least one action is performed based on obtaining the status of the task performed by the accelerator. Invoking the operation and performing the task by the accelerator are performed synchronously. Use of an accelerator increases processing speed for tasks performed by the accelerator rather than using general-purpose instructions. Invoking the accelerator by storing data in a selected location provides a streamlined procedure for invoking the accelerator and eliminates the need to generate new specialized instructions and/or to modify existing instructions to invoke the accelerator and/or perform processing with the accelerator. A synchronous programming model is provided that does not require changing the instruction set architecture to add new instructions or modify existing instructions to perform the synchronous accelerator processing. Virtual memory and virtual addressing is able to be used by the accelerator processing, facilitating the use of memory and processing within the computing environment.

In accordance with one or more aspects, each of the embodiments is separable and optional from one another. Further, embodiments may be combined with one another.

In one or more aspects, a computer program product is provided (and/or a computer system and/or a computer-implemented method). The computer program product includes a set of one or more computer-readable storage media, and program instructions, collectively stored in the set of one or more computer-readable storage media, for causing at least one computing device to perform computer operations. The computer operations include invoking operation of an accelerator of a computing environment based on storing data to be used by the accelerator in a selected location. The selected location is a memory location addressed by a virtual address used by an application to store the data. The storing of the data in the selected location signals to the accelerator that a task is to be performed by the accelerator. Status of the task performed by the accelerator is obtained, and at least one action is performed based on obtaining the status of the task performed by the accelerator. Invoking the operation and performing the task by the accelerator are performed synchronously. Storing the data in the selected location and obtaining the status include executing an instruction that atomically performs the storing of the data in the selected location and the obtaining the status. Use of an accelerator increases processing speed for tasks performed by the accelerator rather than using general-purpose instructions. Invoking the accelerator by storing data in a selected location provides a streamlined procedure for invoking the accelerator and eliminates the need to generate new specialized instructions and/or to modify existing instructions to invoke the accelerator and/or perform processing with the accelerator. A synchronous programming model is provided that does not require changing the instruction set architecture to add new instructions or modify existing instructions to perform the synchronous accelerator processing. Virtual memory and virtual addressing is able to be used by the accelerator processing, facilitating the use of memory and processing within the computing environment. Atomically performing the storing of the data and obtaining the status simplifies handling of interrupts and multiprocessing scenarios, facilitating processing and improving performance.

In accordance with one or more aspects, each of the embodiments is separable and optional from one another. Further, embodiments may be combined with one another.

In one or more aspects, a computer program product is provided (and/or a computer system and/or a computer-implemented method). The computer program product includes a set of one or more computer-readable storage media, and program instructions, collectively stored in the set of one or more computer-readable storage media, for causing at least one computing device to perform computer operations. The computer operations include invoking operation of an accelerator of a computing environment based on storing data to be used by the accelerator in a selected location. The storing of the data in the selected location signals to the accelerator that a task is to be performed by the accelerator. Status of the task performed by the accelerator is obtained, and at least one action is performed based on obtaining the status of the task performed by the accelerator. The selected location is a memory location addressed by a virtual address used by an application to store the data, and the data stored in the selected location includes an address of a parameter block. Contents of the parameter block are related to the task to be performed by the accelerator. Invoking the operation and performing the task by the accelerator are performed synchronously. Storing the data in the selected location and obtaining the status include executing an instruction that atomically performs the storing of the data in the selected location and the obtaining the status. Use of an accelerator increases processing speed for tasks performed by the accelerator rather than using general-purpose instructions. Invoking the accelerator by storing data in a selected location provides a streamlined procedure for invoking the accelerator and eliminates the need to generate new specialized instructions and/or to modify existing instructions to invoke the accelerator and/or perform processing with the accelerator. A synchronous programming model is provided that does not require changing the instruction set architecture to add new instructions or modify existing instructions to perform the synchronous accelerator processing. Virtual memory and virtual addressing is able to be used by the accelerator processing, facilitating the use of memory and processing within the computing environment. Atomically performing the storing of the data and obtaining the status simplifies handling of interrupts and multiprocessing scenarios, facilitating processing and improving performance. Processing is facilitated by providing an address to the data to be used by the accelerator in the location used to signal the accelerator that a task is to be performed by the accelerator.

In accordance with one or more aspects, each of the embodiments is separable and optional from one another. Further, embodiments may be combined with one another.

In one or more aspects, a computer program product is provided (and/or a computer system and/or a computer-implemented method). The computer program product includes a set of one or more computer-readable storage media, and program instructions, collectively stored in the set of one or more computer-readable storage media, for causing at least one computing device to perform computer operations. The computer operations include invoking operation of an accelerator of a computing environment based on storing data to be used by the accelerator in a selected location. The storing of the data in the selected location signals to the accelerator that a task is to be performed by the accelerator. The selected location is a memory location addressed by a virtual address used by an application to store the data, and the data stored in the selected location includes an address of a parameter block. Contents of the parameter block are related to the task to be performed by the accelerator. Status of the task performed by the accelerator is obtained, and at least one action is performed based on obtaining the status of the task performed by the accelerator. The status includes a failing address, and the failing address indicates a page fault. Invoking the operation and performing the task by the accelerator are performed synchronously. Storing the data in the selected location and obtaining the status include executing an instruction that atomically performs the storing of the data in the selected location and the obtaining the status. Use of an accelerator increases processing speed for tasks performed by the accelerator rather than using general-purpose instructions. Invoking the accelerator by storing data in a selected location provides a streamlined procedure for invoking the accelerator and eliminates the need to generate new specialized instructions and/or to modify existing instructions to invoke the accelerator and/or perform processing with the accelerator. A synchronous programming model is provided that does not require changing the instruction set architecture to add new instructions or modify existing instructions to perform the synchronous accelerator processing. Virtual memory and virtual addressing is able to be used by the accelerator processing, facilitating the use of memory and processing within the computing environment. Atomically performing the storing of the data and obtaining the status simplifies handling of interrupts and multiprocessing scenarios, facilitating processing and improving performance. Processing is facilitated by providing an address to the data to be used by the accelerator in the location used to signal the accelerator that a task is to be performed by the accelerator.

In accordance with one or more aspects, each of the embodiments is separable and optional from one another. Further, embodiments may be combined with one another.

In one or more aspects, a computer program product is provided (and/or a computer system and/or a computer-implemented method). The computer program product includes a set of one or more computer-readable storage media, and program instructions, collectively stored in the set of one or more computer-readable storage media, for causing at least one computing device to perform computer operations. The computer operations include invoking operation of an accelerator of a computing environment based on storing data to be used by the accelerator in a selected location. The storing of the data in the selected location signals to the accelerator that a task is to be performed by the accelerator. The selected location is a memory location. Status of the task performed by the accelerator is obtained, and at least one action is performed based on obtaining the status of the task performed by the accelerator. Storing the data in the selected location includes executing a store instruction to store the data in the selected location and obtaining the status includes executing a load instruction to obtain the status. Use of an accelerator increases processing speed for tasks performed by the accelerator rather than using general-purpose instructions. Invoking the accelerator by storing data in a selected location provides a streamlined procedure for invoking the accelerator and eliminates the need to generate new specialized instructions and/or to modify existing instructions to invoke the accelerator and/or perform processing with the accelerator. The storing facilitates signaling the accelerator to perform a task. Using the memory location simplifies the signaling while providing data useful in performing the task. This improves processing. Using the load instruction facilitates the synchronous processing by indicating when the accelerator has completed processing signifying that other work may be performed by the computing device waiting for status from the accelerator.

In accordance with one or more aspects, each of the embodiments is separable and optional from one another. Further, embodiments may be combined with one another.

In one or more aspects, a computer system is provided. The computer system includes at least one computing device, a set of one or more computer-readable storage media, and program instructions, collectively stored in the set of one or more computer-readable storage media, for causing the at least one computing device to perform computer operations. The computer operations include invoking operation of an accelerator of a computing environment based on storing data to be used by the accelerator in a selected location. The storing of the data in the selected location signals to the accelerator that a task is to be performed by the accelerator. Status of the task performed by the accelerator is obtained, and at least one action is performed based on obtaining the status of the task performed by the accelerator. Use of an accelerator increases processing speed for tasks performed by the accelerator rather than using general-purpose instructions. Invoking the accelerator by storing data in a selected location provides a streamlined procedure for invoking the accelerator and eliminates the need to generate new specialized instructions and/or to modify existing instructions to invoke the accelerator and/or perform processing with the accelerator.

Additionally, or alternatively, in one example, invoking the operation and performing the task by the accelerator are performed synchronously. A synchronous programming model is provided that does not require changing the instruction set architecture to add new instructions or modify existing instructions to perform the synchronous accelerator processing.

Additionally, or alternatively, in one example, the selected location is a memory location addressed by a virtual address used by an application to store the data. Virtual memory and virtual addressing is able to be used by the accelerator processing, facilitating the use of memory and processing within the computing environment.

Additionally, or alternatively, in one example, storing the data in the selected location and obtaining the status include executing an instruction that atomically performs the storing of the data in the selected location and the obtaining the status. Atomically performing the storing of the data and obtaining the status simplifies handling of interrupts and multiprocessing scenarios, facilitating processing and improving performance.

Additionally, or alternatively, in one example, storing the data in the selected location includes executing a store instruction to store the data in the selected location and obtaining the status includes executing a load instruction to obtain the status. The selected location is a memory location. The storing facilitates signaling the accelerator to perform a task. Using the memory location simplifies the signaling while providing data useful in performing the task. This improves processing. Using the load instruction facilitates the synchronous processing by indicating when the accelerator has completed processing signifying that other work may be performed by the computing device waiting for status from the accelerator.

In accordance with one or more aspects, each of the embodiments is separable and optional from one another. Further, embodiments may be combined with one another.

In one or more aspects, a computer-implemented method is provided. The computer-implemented method includes invoking, by a computing device, operation of an accelerator of a computing environment based on storing data to be used by the accelerator in a selected location. The storing of the data in the selected location signals to the accelerator that a task is to be performed by the accelerator. Status of the task performed by the accelerator is obtained, and at least one action is performed based on obtaining the status of the task performed by the accelerator. Use of an accelerator increases processing speed for tasks performed by the accelerator rather than using general-purpose instructions. Invoking the accelerator by storing data in a selected location provides a streamlined procedure for invoking the accelerator and eliminates the need to generate new specialized instructions and/or to modify existing instructions to invoke the accelerator and/or perform processing with the accelerator.

Additionally, or alternatively, in one example, invoking the operation and performing the task by the accelerator are performed synchronously. A synchronous programming model is provided that does not require changing the instruction set architecture to add new instructions or modify existing instructions to perform the synchronous accelerator processing.

Additionally, or alternatively, in one example, the selected location is a memory location addressed by a virtual address used by an application to store the data. Virtual memory and virtual addressing is able to be used by the accelerator processing, facilitating the use of memory and processing within the computing environment.

Additionally, or alternatively, in one example, storing the data in the selected location and obtaining the status include executing an instruction that atomically performs the storing of the data in the selected location and the obtaining the status. Atomically performing the storing of the data and obtaining the status simplifies handling of interrupts and multiprocessing scenarios, facilitating processing and improving performance.

Additionally, or alternatively, in one example, storing the data in the selected location includes executing a store instruction to store the data in the selected location and obtaining the status includes executing a load instruction to obtain the status. The selected location is a memory location. The storing facilitates signaling the accelerator to perform a task. Using the memory location simplifies the signaling while providing data useful in performing the task. This improves processing. Using the load instruction facilitates the synchronous processing by indicating when the accelerator has completed processing signifying that other work may be performed by the computing device waiting for status from the accelerator.

In accordance with one or more aspects, each of the embodiments is separable and optional from one another. Further, embodiments may be combined with one another.

In one or more aspects, a computer program product is provided. The computer program product includes a set of one or more computer-readable storage media, and program instructions, collectively stored in the set of one or more computer-readable storage media, for causing a hardware accelerator to perform computer operations. The computer operations include determining, by the hardware accelerator, that it is being invoked by a computing device coupled to the hardware accelerator. The determining is based on data to be used by the hardware accelerator being stored in a selected location. The storing of the data in the selected location signals to the hardware accelerator that a task is to be performed by the accelerator. The hardware accelerator performs the task based on being invoked. The performing the task uses the data stored in the selected location. The hardware accelerator provides status of the task performed by the hardware accelerator. Use of an accelerator increases processing speed for tasks performed by the accelerator rather than using general-purpose instructions. Invoking the accelerator by storing data in a selected location provides a streamlined procedure for invoking the accelerator and eliminates the need to generate new specialized instructions and/or to modify existing instructions to invoke the accelerator and/or perform processing with the accelerator.

In accordance with one or more aspects, each of the embodiments is separable and optional from one another. Further, embodiments may be combined with one another.

In one or more aspects, a computer-implemented method is provided. The computer-implemented method includes determining, by a hardware accelerator, that it is being invoked by a computing device coupled to the hardware accelerator. The determining is based on data to be used by the hardware accelerator being stored in a selected location. The storing of the data in the selected location signals to the hardware accelerator that a task is to be performed by the accelerator. The hardware accelerator performs the task based on being invoked. The performing the task uses the data stored in the selected location. The hardware accelerator provides status of the task performed by the hardware accelerator. Use of an accelerator increases processing speed for tasks performed by the accelerator rather than using general-purpose instructions. Invoking the accelerator by storing data in a selected location provides a streamlined procedure for invoking the accelerator and eliminates the need to generate new specialized instructions and/or to modify existing instructions to invoke the accelerator and/or perform processing with the accelerator.

In accordance with one or more aspects, each of the embodiments is separable and optional from one another. Further, embodiments may be combined with one another.

Computer program products, computer systems and computer-implemented methods relating to one or more aspects are described and claimed herein. Each of the embodiments of the computer program product may be embodiments of each computer system and/or each computer-implemented method and vice-versa. Further, each of the embodiments is separable and optional from one another. Moreover, embodiments may be combined with one another. Each of the embodiments of the computer program product may be combinable with aspects and/or embodiments of each computer system and/or computer-implemented method, and vice-versa.

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) that, e.g., performs synchronous hardware accelerator interface processing and/or one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as synchronous hardware accelerator interface code 150 (also referred to herein as block 150). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Cloud computing services and/or microservices (not separately shown in FIG. 1): private and public clouds 106, 105 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The computing environment described above is only one example of a computing environment to incorporate, perform and/or use one or more aspects of the present disclosure. Other examples are possible. For instance, in one or more embodiments, one or more of the components/modules/blocks of FIG. 1 are not included in the computing environment and/or are not used for one or more aspects of the present disclosure. Further, in one or more embodiments, additional and/or other components/modules/blocks may be used. Other variations are possible.

Figure 2:
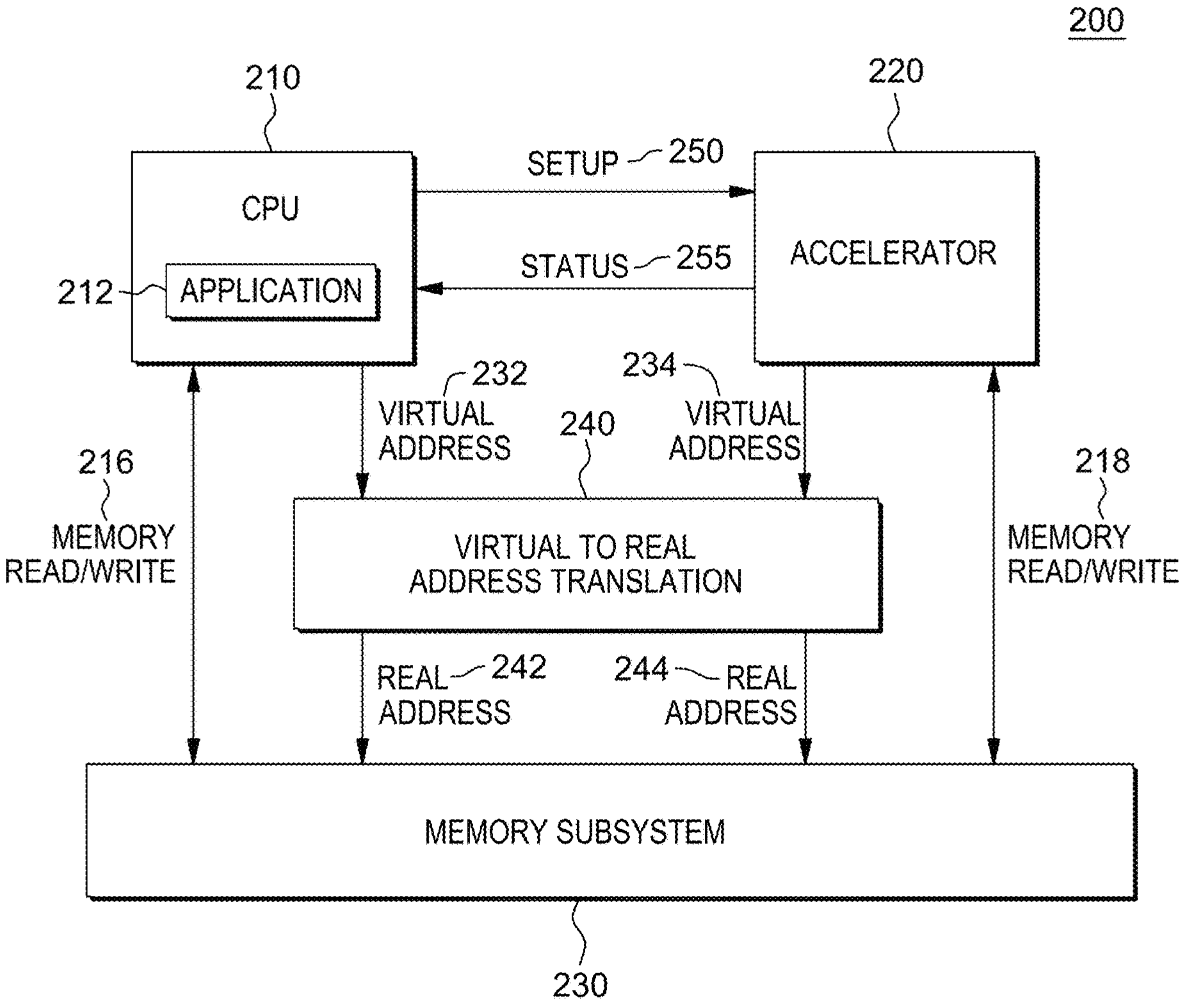
FIG. 2 depicts another example of a computing environment to incorporate and use one or more aspects of the present disclosure.

Another example of a computing environment to incorporate and use one or more aspects of the present disclosure is described with reference to FIG. 2. In one example, a computing environment 200 includes a central processing unit (CPU) 210 (or other processor) coupled to an accelerator 220 (e.g., hardware accelerator), both of which are coupled to a memory subsystem (also referred to as memory or storage) 230. An application 212 executing on central processing unit 210 reads/writes 216 to memory subsystem 230, and in one example, uses virtual addressing. Therefore, one or more virtual addresses 232 used by the application are translated using, e.g., virtual to real address translation 240 to generate one or more real addresses 242 used to load from and/or store data to memory subsystem 230. Similarly, accelerator 220 reads/writes 218 to memory subsystem 230, and in one example, uses virtual addressing. Therefore, one or more virtual addresses 234 used by the accelerator are translated using, e.g., virtual to real address translation 240 to generate one or more real addresses 244 used to load from and/or store data to memory subsystem 230.

In one or more aspects, there are one or more setup interfaces 250 between central processing unit 210 and accelerator 220, as well as one or more status interfaces 255. Setup interfaces 250 provide information (e.g., parameter block information (e.g., an address of a parameter block (e.g., a virtual memory location) and/or contents of a parameter block)) to accelerator 220 and status interfaces 255 receive information (e.g., accelerator operation status) from accelerator 220, as examples. Setup interface(s) 250 and status interface(s) 255 may be separate interfaces or a single interface that provides setup and status. In one example, setup interface(s) 250 and status interface(s) 255 are provided by synchronous hardware accelerator interface code

150. In other examples, separate code may be used for the setup interface(s) and the status interface(s). Other examples are possible In one or more aspects, accelerator 220 may be used by multiple applications (e.g., multiple software threads) in which requests may be queued from the applications and processed by the accelerator based on a selection mechanism (e.g., first in, first out; selection based on priority; round-robin; etc.). Mechanisms other than queuing may also be used to arbitrate between multiple applications. Various examples are possible.

Figure 3:
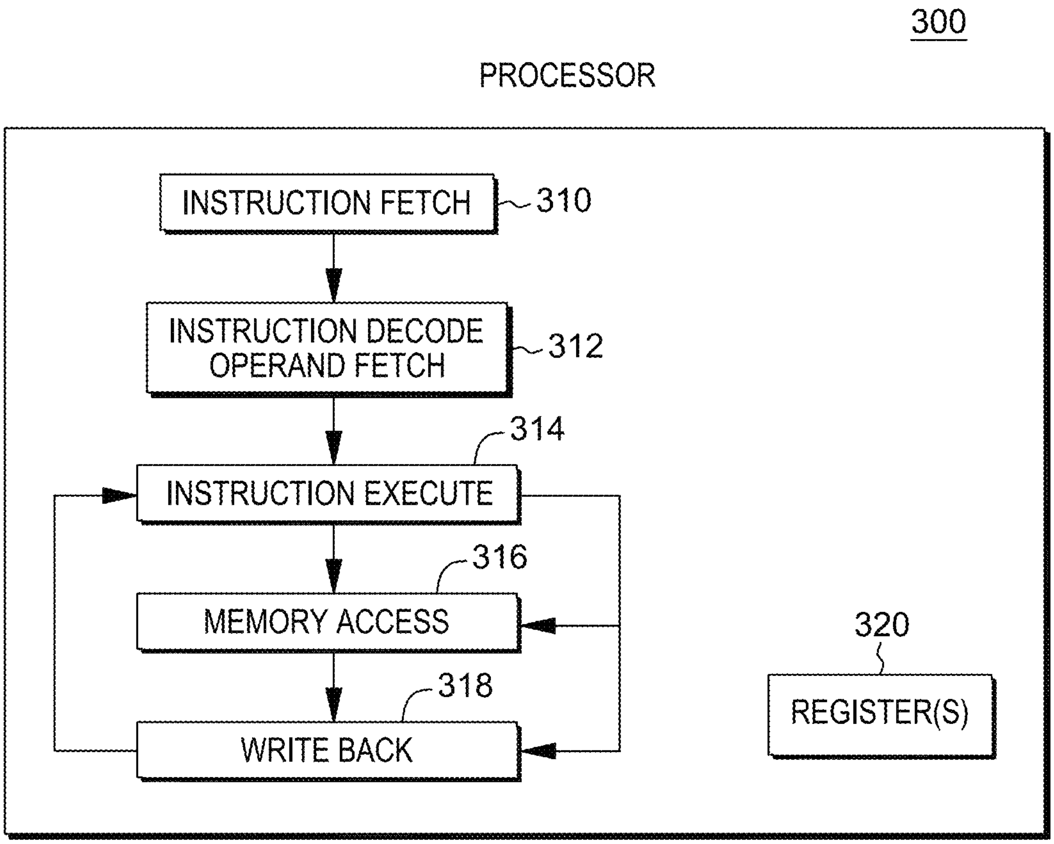
FIG. 3 depicts one example of further details of a processor, in accordance with one or more aspects of the present disclosure.

In one example, a processor (e.g., of processor set 110, central processing unit 210) includes a plurality of functional components (or a subset thereof) used to execute instructions. As depicted in FIG. 3, in one example, a processor 300 includes, for instance, an instruction fetch component 310 to fetch instructions to be executed; an instruction decode/operand fetch component 312 to decode the fetched instructions and to obtain operands of the decoded instructions; one or more instruction execute components 314 to execute the decoded instructions; a memory access component 316 to access memory for instruction execution, if necessary; and a write back component 318 to provide the results of the executed instructions. One or more of the components may access and/or use one or more registers 320 in instruction processing. Further, one or more of the components may access and/or use synchronous hardware accelerator interface code 150. Additional, fewer and/or other components may be used in one or more aspects of the present disclosure.

In one example, instructions used in one or more aspects of the present disclosure are part of an instruction set architecture. One example of an instruction set architecture that includes one or more instructions incorporated and/or used in one or more aspects of the present disclosure is the z/Architecture® instruction set architecture offered by International Business Machines Corporation, Armonk, New York. One embodiment of the z/Architecture instruction set architecture is described in a publication entitled, "z/Architecture Principles of Operation," IBM Publication No. SA22-7832-13, Fourteenth Edition, May 2022, which is hereby incorporated herein by reference in its entirety. The z/Architecture instruction set architecture, however, is only one example architecture; other architectures and/or other types of computing environments of International Business Machines Corporation and/or of other entities/companies may include and/or use one or more aspects of the present disclosure. z/Architecture and IBM are trademarks or registered trademarks of International Business Machines Corporation in at least one jurisdiction.

The computing environments described herein, such as computing environments 100, 200, and/or additional, fewer and/or other computing environments may use synchronous hardware accelerator interface code 150. The code is, e.g., computer-readable program code (e.g., instructions) in computer-readable storage media, e.g., storage (persistent storage 113, cache 121, storage 124, other storage, as examples). The computer-readable storage media may be part of one or more computer program products and the computer-readable program code may be executed by and/or using one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 300), central processing unit 210, one or more accelerators (also referred to as coprocessors), such as accelerator 220, and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute the code and/or portions thereof. Many examples are possible.

Figure 4:
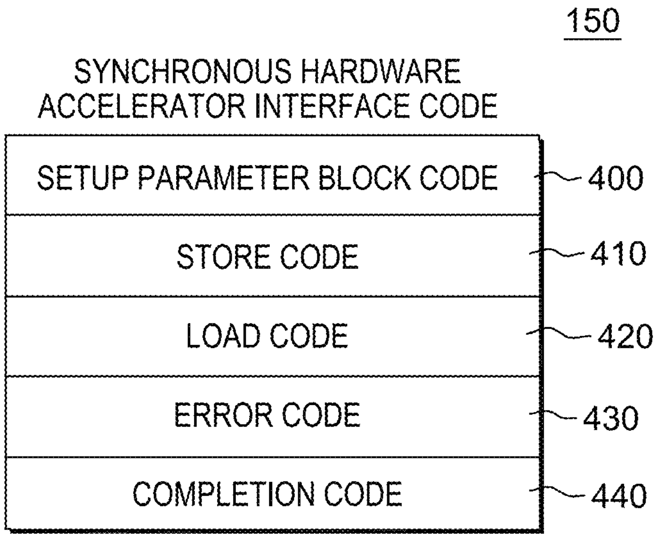
FIG. 4 depicts one example of the synchronous hardware accelerator interface code of FIG. 1, in accordance with one or more aspects of the present disclosure.

In one example, referring to FIG. 4, synchronous hardware accelerator interface code 150 includes, for instance, setup parameter block code 400 to setup a parameter block (e.g., a control block) to be used by an accelerator (e.g., accelerator 220) in performing one or more tasks; store code 410 to be used to store data (e.g., contents of a general purpose register, referred to herein as GPRx) to a selected location (e.g., a selected memory location referred to herein as AccelAddr, accelerator address, accelerator interface address, etc.; a selected register, referred to herein as an accelerator register, accelerator interface register, etc.); load code 420 to be used to load status (e.g., contents of the selected memory location) into another selected location (e.g., GPRx; a status register; another location; etc.); error code 430 to be used to process an error code, such as a page fault; and/or completion code 440 to be used to complete synchronous hardware accelerator interface processing. Additional, less and/or other code may be used.

Although synchronous hardware accelerator interface code 150 is depicted in persistent storage 113, one or more code portions may be in other locations, other than persistent storage 113. Many examples are possible.

Figure 5A:
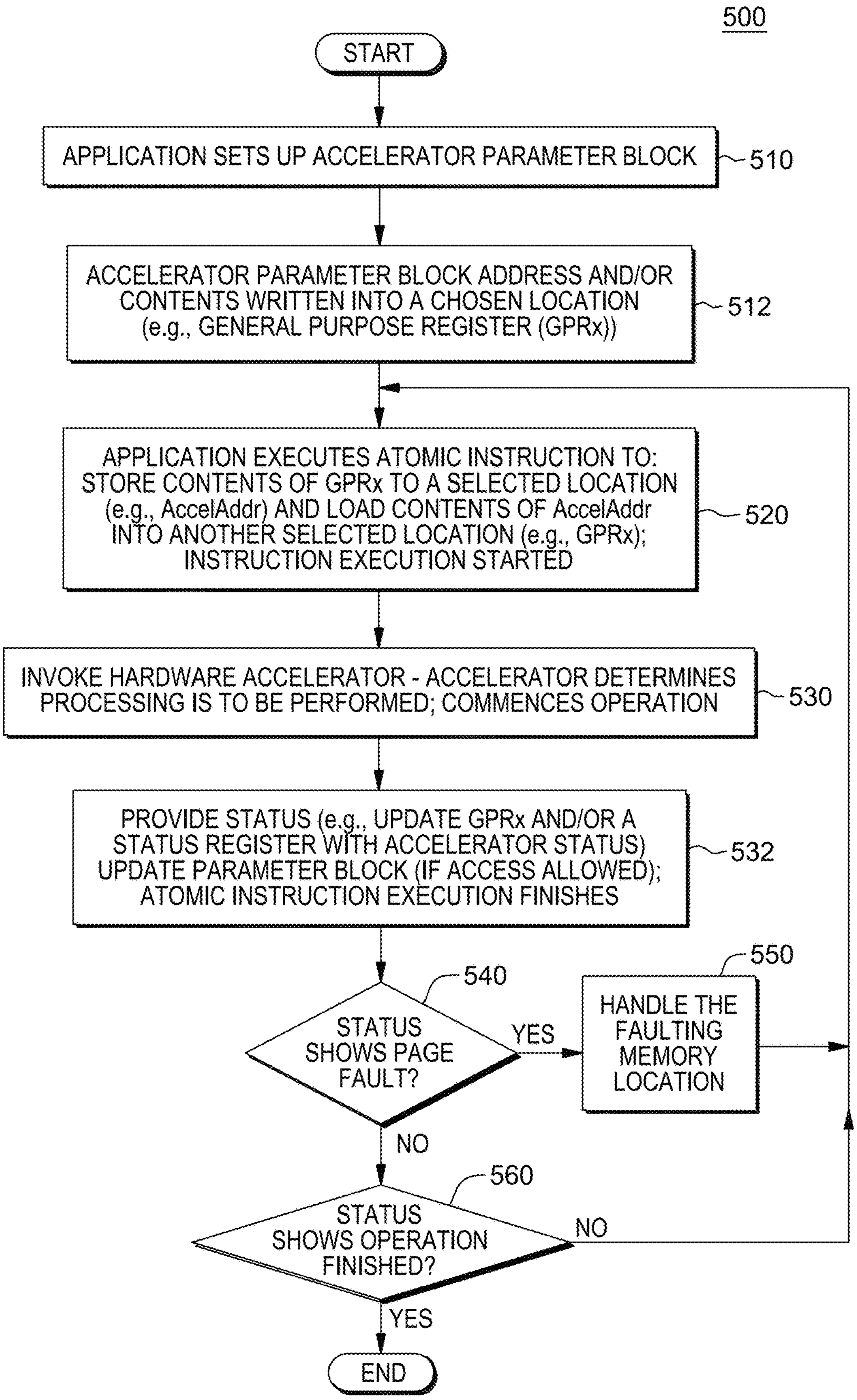
FIG. 5A depicts one example of synchronous hardware accelerator interface processing, in accordance with one or more aspects of the present disclosure.

In one example, synchronous hardware accelerator interface code is used in synchronous hardware accelerator interface processing. One example of a synchronous hardware accelerator interface process is described with reference to FIG. 5A. In one example, a synchronous hardware accelerator interface process 500 is executed by one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 300), central processing unit 210, one or more accelerators (also referred to as coprocessors), such as accelerator 220, and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute the processing and/or aspects thereof. Many examples are possible.

In one example, synchronous hardware accelerator interface process 500 (also referred to as process 500) includes an application (e.g., executing on a computing device) setting up 510 a parameter block (also referred to herein as an accelerator parameter block), which is, for instance, a control block to include selected information to be provided and/or used by an accelerator (e.g., accelerator 220) to perform one or more tasks (e.g., encryption, decryption, other cryptographic operations, compression, decompression, other types of tasks, etc.). The application uses, in one example, setup parameter block code 400 to set up the parameter block in, e.g., its virtual memory space and place information that is based on the tasks to be performed by the accelerator (e.g., selected information) in the parameter block. For instance, if a task to be performed by the accelerator relates to cryptography, then the parameter block may include a cryptographic key, one or more addresses for input data, one or more addresses for output data and/or other information to be used to encrypt/decrypt certain data. Many other examples are possible.

In one example, process 500, via the application, writes 512 an address of the parameter block (e.g., virtual memory location) and/or contents of the parameter block into a chosen location, such as a general-purpose register (e.g., GPRx). Further, the application (e.g., using store code 410 and/or load code 420) executes 520 an atomic instruction (e.g., an existing compare and swap instruction, compare instruction or other atomic instruction unmodified for use by process 500) to store the contents of the general-purpose register (e.g., GPRx) to a selected location (e.g., AccelAddr), and based on accelerator processing, described below, load status (e.g., contents of the selected location (e.g., AccelAddr)) into another selected location (e.g., general purpose register (e.g., GPRx or another general-purpose register), another register or another location, etc.). The chosen location and the another selected location may use the same general purpose register (or location) or different general purpose registers (or locations). Many examples are possible.

In one example, the selected location is provided to the application by, e.g., an operating system interface detected by the operating system, e.g., at boot time, or by another mechanism. The selected location is, for instance, a memory location (e.g., a virtual memory location), referred to herein as AccelAddr, accelerator address, accelerator interface address, etc. In other examples, it may be a selected register, referred to herein as an accelerator register, accelerator interface register, etc. Other examples are possible.

Based on writing data to the selected location (e.g., AccelAddr), process 500 invokes 530 the accelerator (e.g., accelerator 220), in accordance with one or more aspects. For instance, the accelerator determines 530 (e.g., by polling, being awoken (e.g., signaled), etc.) based on the data stored in the selected location that there is processing to be performed and commences operation. Instead of executing an actual memory operation, the processor executing the application interprets the access to AccelAddr as a command to the accelerator. The store instruction is started, but stalls until the accelerator operation has finished. From the program's point of view, the store instruction is a potentially long latency accelerator call, synchronous to the program's execution.

The accelerator performs one or more tasks (e.g., performs encryption, decryption, other cryptographic operations, compression, decompression, other types of tasks, etc.) based on the information in the parameter block and provides 532 status. For instance, it updates the other selected location (e.g., GPRx or another general-purpose register, another register or another location, etc.) and/or a status register with accelerator status. For instance, contents of the selected location (e.g., AccelAddr) are loaded into the general-purpose register (e.g., GPRx or another general-purpose register), another register or another location. In one example, if an error, such as a page fault, occurred during accelerator processing, status of such an error may be included in a status register, an example of which is described below.

In one example, the accelerator may also update the parameter block, if access to the parameter block is allowed. Based on loading the contents of the selected location (e.g., AccelAddr) into the other selected location (e.g., GPRx or another general-purpose register), another register or another location), atomic execution of the instruction completes, in one example.

Based on the atomic execution completing, in one example, process 500, via the application, determines 540 (e.g., using error code 430) whether the status loaded into the another selected location (e.g., GPRx or another general-purpose register, another register or another location) and/or status register indicates an error, such as a page fault. As both the parameter block and any data potentially used by the hardware accelerator, such as input or output buffers, are placed in virtual memory, they may not be readily accessible due to having been paged out by the operating system. If this is the case, the accelerator operation continues up to the point where it hits non-accessible memory and then finishes. An appropriate "page fault hit" indication is set for the accelerator's status. Such a status indication includes, in one example, the address where the page fault was detected, as shown in FIG. 6.

Figure 6:
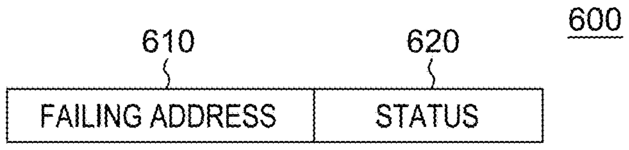
FIG. 6 depicts one example of a status register used in accordance with one or more aspects of the present disclosure.

As an example, referring to FIG. 6, a status register 600 is, for instance, a 64-bit register, in which a failing address 610 is included in, e.g., bits 0-51 of register 600 and optional status 620 is included in, e.g., bits 52-63 of register 600. Other examples are possible, including, but not limited to, registers of different sizes and/or additional, less and/or other information to be included in the register.

Returning to FIG. 5A, if there is a page fault, then, in one example, process 500, at least, performs operations 550 to handle the page fault (a.k.a., faulting memory location). For instance, it notifies the operating system or a memory controller of the page fault and/or re-executes 520 the atomic instruction. Other examples are possible.

To further explain, in one example, to resolve page faults, the operating system is made aware of the non-mapped page. The store instruction that eventually led to the detection of the page fault only accessed, in this example, the accelerator interface address, so that store does not directly report the page fault. Instead, this can be achieved by the application touching the failing address, either by executing a load instruction/operation or a store instruction/operation targeting the failing address. Whether a load or a store is to be used is indicated, in one example, as part of the status (e.g., status 620). Accessing the address in that way triggers the operating system to map the page and is a very light-way mechanism of resolving page faults.

If the accelerator operation is interrupted due to a page fault, the parameter block is updated accordingly, in one example. Restarting the accelerator operation by repeating the store to the selected address (e.g., AccelAddr) continues the operation where it left off.

To simplify handling in the presence of interrupts and potentially multiple processors accessing the accelerator in parallel, the operations of first executing a store operation to start the accelerator operation, and then later executing a load operation to read the status is combined into one atomic store/load instruction, such as a compare and swap instruction or other instruction that can atomically perform the store and the load.

Returning to inquiry 540, based on the status not indicating a page fault, process 500 determines 560 (e.g., using completion code 440) whether the status loaded into the another selected address (e.g., GPRx or another general-purpose register), another register or another location) indicates completion. If not, processing continues with re-executing 520 the atomic instruction; otherwise, processing is complete.

Figure 5B:
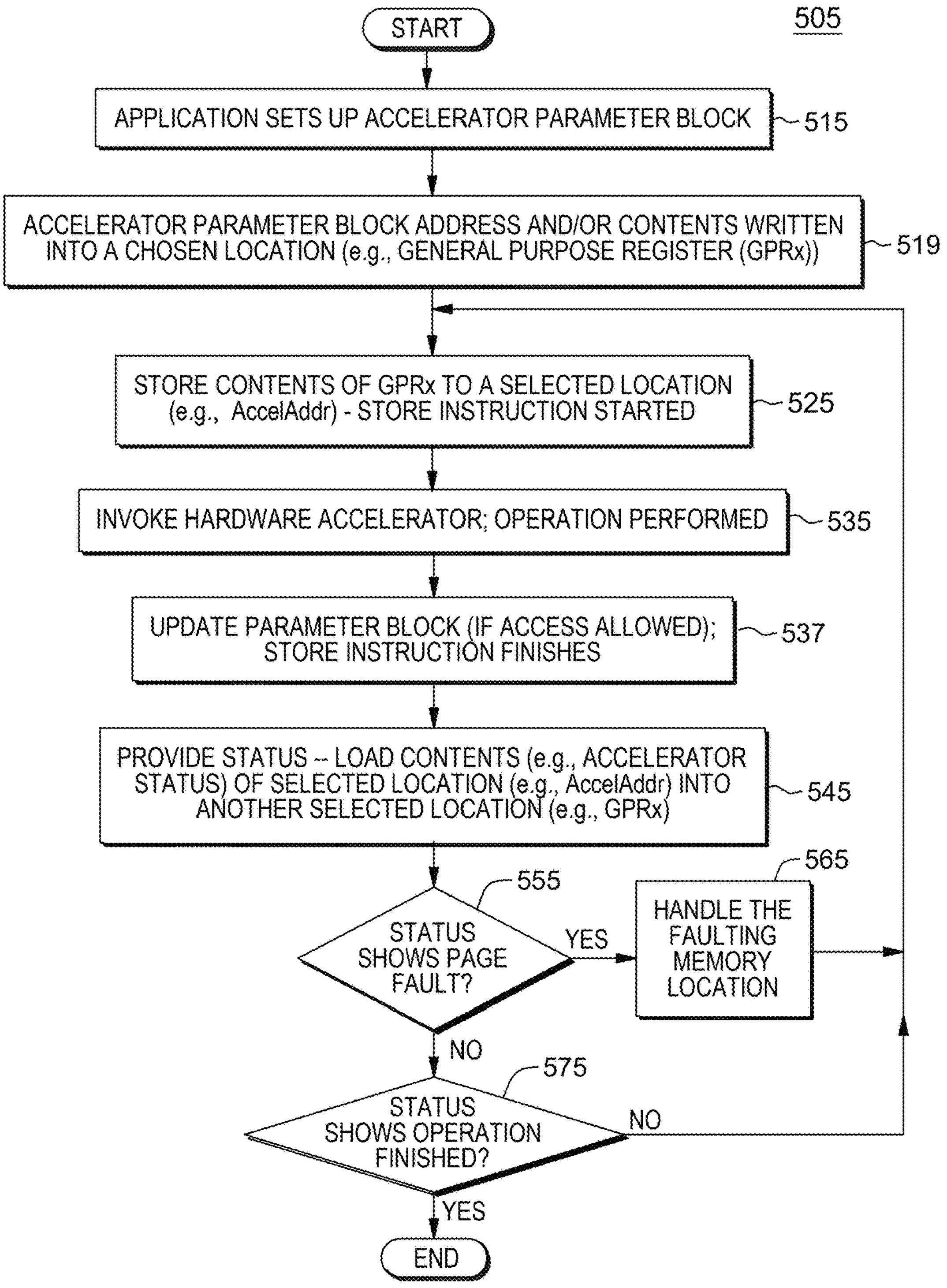
FIG. 5B depicts another example of synchronous hardware accelerator interface processing, in accordance with one or more aspects of the present disclosure.

In the above example, an atomic operation is used to perform the store and the load; however, in another example, the store and load are performed non-atomically, as described with reference to FIG. 5B.

Another example of a synchronous hardware accelerator interface process is described with reference to FIG. 5B. In one example, a synchronous hardware accelerator interface process 505 is executed by one or more computing devices (e.g., one or more computers, such as computer(s) 101 and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 300), central processing unit 210, one or more accelerators (also referred to as coprocessors), such as accelerator 220, and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute the processing and/or aspects thereof. Many examples are possible.

In one example, synchronous hardware accelerator interface process 505 (also referred to as process 505) includes an application (e.g., executing on a computing device) setting up 515 a parameter block (also referred to herein as an accelerator parameter block), which is, for instance, a control block to include selected information to be provided and/or used by an accelerator (e.g., accelerator 220) to perform one or more tasks (e.g., encryption, decryption, other cryptographic operations, compression, decompression, other types of tasks, etc.). The application uses, in one example, setup parameter block code 400 to set up the parameter block in, e.g., its virtual memory space and place information that is based on the tasks to be performed by the accelerator (e.g., selected information) in the parameter block. For instance, if a task to be performed by the accelerator relates to cryptography, then the parameter block may include a cryptographic key, one or more addresses for input data, one or more addresses for output data and/or other information to be used to encrypt/decrypt certain data. Many other examples are possible.

In one example, process 505, via the application, writes 519 an address of the parameter block and/or contents of the parameter block into a chosen location, such as a general-purpose register (e.g., GPRx). Further, the application (e.g., using store code 410) executes 525 a store instruction (e.g., an existing store instruction unmodified for use by a synchronous hardware accelerator interface process) to store the contents of the general-purpose register (e.g., GPRx) to a selected location (e.g., AccelAddr).

Based on writing data to the selected location (e.g., AccelAddr), process 505 invokes 535 the accelerator (e.g., accelerator 220), in accordance with one or more aspects. For instance, the accelerator determines (e.g., by polling, being awoken (e.g., signaled), etc.) based on the data stored in the selected location that there is processing to be performed and commences operation. Instead of executing an actual memory operation, the processor executing the application interprets the access to AccelAddr as a command to the accelerator. The store instruction is started, but stalls until the accelerator operation has finished. From the program's point of view, the store instruction is a potentially long latency accelerator call, synchronous to the program's execution.

The accelerator performs one or more tasks (e.g., encryption, decryption, other cryptographic operations, compression, decompression, other types of tasks, etc.) based on the information in the parameter block. In one example, the accelerator may also update 537 the parameter block, if access to the parameter block is allowed. Execution of the store instruction completes.

Based on completing execution of the store instruction, process 505 provides 545 status. For instance, contents (e.g., accelerator status) of the selected location (e.g., AccelAddr) are loaded into the other selected location (e.g., GPRx or another general-purpose register, another register or another location, etc.) and/or a status register. In one example, a load instruction (e.g., an existing load instruction unmodified for synchronous hardware accelerator interface processing) is used to load the contents of the selected location (e.g., AccelAddr) into the general-purpose register (e.g., GPRx or another general-purpose register), another register or another location. In one example, if an error, such as a page fault, occurred during accelerator processing, status of such an error may be included in a status register (e.g., status register 600).

Based on the load instruction completing, in one example, process 505, via the application, determines 555 (e.g., using error code 430) whether the status loaded into the other selected location (e.g., GPRx or another general-purpose register, another register or another location) and/or a status register indicates an error, such as a page fault. If there is a page fault, then, in one example, process 505, at least, performs operations 565 to handle the page fault (a.k.a., faulting memory location). For instance, it notifies the operating system or a memory controller of the page fault and/or re-executes 525 the store instruction. Other examples are possible.

Returning to inquiry 555, based on the status not indicating a page fault, process 505 determines 575 (e.g., using completion code 440) whether the status loaded into the other selected location (e.g., GPRx or another general-purpose register, another register or another location) indicates completion. If not, processing continues with re-executing 525 the store instruction; otherwise, processing is complete.

Described above is a capability for synchronous hardware accelerator processing that includes, for instance, a synchronous hardware accelerator interface for applications using virtual addresses. In one or more aspects, to invoke an accelerator (e.g., hardware accelerator), software (e.g., an application) executes, for instance, a store instruction to store the value of a selected register (e.g., GPRx) to a selected location (e.g., AccelAddr). Instead of executing an actual memory operation, the processor executing the application interprets the access to AccelAddr as a command to the accelerator. The store instruction is started, but stalls until the accelerator operation has finished. From the program's point of view, the store instruction is a potentially long latency accelerator call, synchronous to the program's execution.

In one example, the processor reads the virtual memory address of the parameter block from GPRx, as supplied in the store instruction. It uses the information in the parameter block to operate the accelerator hardware. Once the accelerator completes its operation, in one example, the parameter block is updated to reflect the results. The status of the operation is stored in an accelerator-specific hardware status register. The store instruction executed by the program can now finish, and the program can continue with its next instruction.

The program's next step is likely to check the status of the accelerator operation by executing a load to AccelAddr. This load returns the status value remembered in the accelerator-specific hardware status register, as one example.

In one or more aspects, the above is performed instead of using a dedicated instruction. Typically, in some architectures, hardware accelerator interfaces are defined by means of adding an instruction (e.g., a Complex Instruction Set Computer (CISC) instruction) to the instruction set (referred to herein as a dedicated instruction approach). In the dedicated instruction approach, a general-purpose register points to a parameter block that holds control information and pointers to data buffers in virtual memory space. Software (e.g., an application) invokes the instruction like any other processor instruction. If page faults are found while trying to access virtual memory, the dedicated instruction is interrupted by a normal page fault interrupt, allowing the operating system to install a valid mapping for the page. Status information from the accelerator is returned through the architected condition code and fields in the provided parameter block. This status may include the information that the dedicated instruction is to be restarted, possibly because it was interrupted due to a page fault.

Other previous implementations consider the accelerator to be an external device (referred to herein as an external device approach). For example, it may look like a device attached to a Peripheral Component Interconnect Express (PCIe) interface. Typically, memory-mapped Input/Output (IO) (MMIO) is used to convey control information, and direct memory access is used to transfer data. As input/output is often left to the operating system, the accelerator may not be accessible without operating system overhead. Alternatively, extra effort by the application and the operating system may be required to map the MMIO addresses and potentially the data buffers for direct memory access into application space.

Further, a mechanism may be provided where software communicates with an accelerator using message queues. This, however, requires dedicated enqueue/dequeue instructions, and an asynchronous method to invoke the accelerator.

Yet another alternative is to attach the accelerator through a standard network protocol and communicate with it using, e.g., Transmission Control Protocol/Internet Protocol (TCP/IP). The network-attached mechanism results in extremely long latencies relative to normal instruction execution and requires data transfer over the network. Further, significant glue code for the network communication part is needed.

Described herein is a capability that provides synchronous hardware accelerator processing that combines the ease-of-use of a dedicated instruction approach with the flexibility offered by the external device approach. It provides a capability that does not require a new dedicated instruction, dedicated enqueue/dequeue instructions nor significant glue code for network communications. It provides a hardware/software interface that enables a fully synchronous programming model absent a need to change the instruction set architecture to add new instructions or modify existing instructions. The capability provides a low-overhead solution to resolving page faults on memory locations accessed by the accelerator. The selected location (e.g., memory address) behaves in such a manner that the value stored to it and the value read from it can be different, reflecting the fact that the read happens from a "device" and not from normal memory.

In one or more aspects, a hardware/software interface that enables a fully synchronous programming model to access hardware accelerators without changing an instruction set architecture is provided that identifies a virtual memory location in an application's virtual memory space as the control and status (interface) register for accelerator hardware (e.g., AccelAddr); sets up, by an application, an accelerator parameter block in the application's virtual memory space; stores (via software), using an existing instruction, parameter block information to the accelerator interface register (instead of executing an actual memory operation, the processor interprets the access to the control/status interface memory address as a command to the accelerator), in which program execution is stalled until the accelerator operation is complete and the status of the operation is read back from the accelerator interface address.

In one or more aspects, memory addresses are identified as accelerator interfaces. An existing store instruction to the memory address is used to transfer the address of the parameter block to the accelerator. The store instruction finishes execution subsequent to the accelerator finishing processing; in that sense, it looks like an ordinary store instruction (with a relatively long latency), and the accelerator operation happens synchronously to program execution.

A load instruction to the accelerator interface address is used to read the return accelerator's return status.

In one or more aspects, a plurality of accelerators are added by providing additional memory locations for accelerator control and status registers.

Although various examples are described above, other variations and embodiments are possible. Other instructions may use one or more aspects of the present disclosure.

Figure 7A:
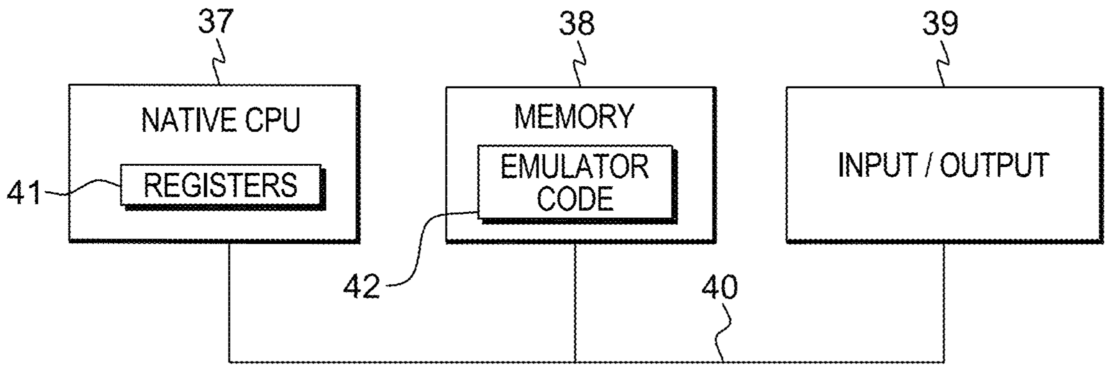
FIGS. 7A-7B depict another example of a computing environment to incorporate and use one or more aspects of the present disclosure.
Figure 7B:
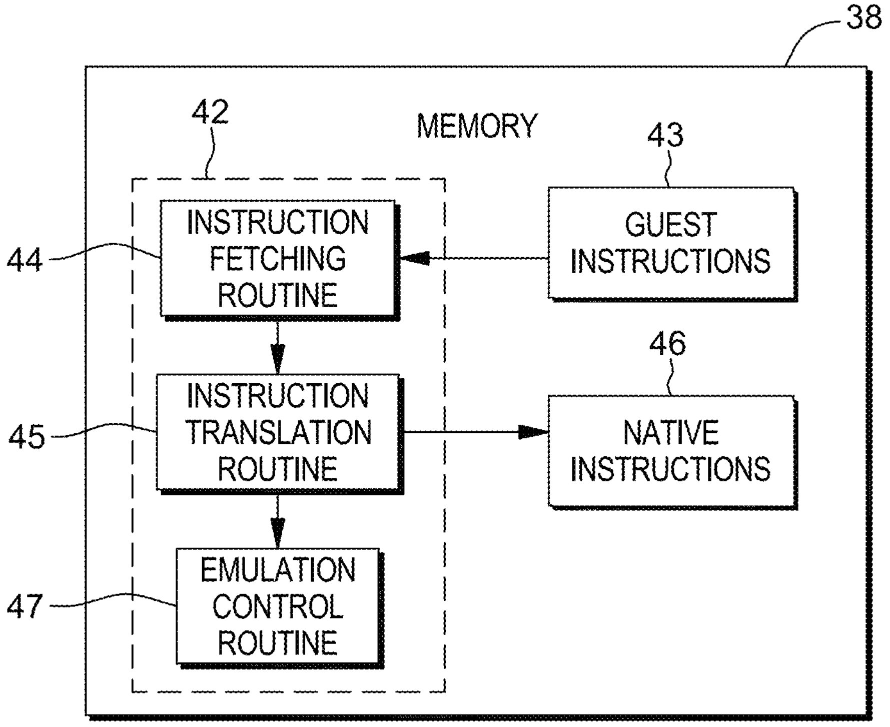

Further, although one or more examples of a computing environment to incorporate and use one or more aspects of the present disclosure are described herein, FIGS. 7A-7B depict another embodiment of a computing environment to incorporate and use one or more aspects of the present disclosure.

Referring, initially, to FIG. 7A, in this example, a computing environment 36 includes, for instance, a native central processing unit (CPU) 37 based on one architecture having one instruction set architecture, a memory 38, and one or more input/output devices and/or interfaces 39 coupled to one another via, for example, one or more buses 40 and/or other connections.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture (different from the one architecture) and to execute software and instructions developed based on the other architecture.

Further details relating to emulator code 42 are described with reference to FIG. 7B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the other instruction set architecture, but instead, are being emulated on native CPU 37, which may be, for example, the one instruction set architecture. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An example instruction that may be emulated is a store instruction, a load instruction, an atomic instruction (e.g., a compare and swap instruction), other instructions executed by an application and/or instruction execution processing that uses synchronous hardware accelerator interfaces may be emulated, in accordance with one or more aspects of the present disclosure.

The computing environments described herein are only examples of computing environments that can be used. One or more aspects of the present disclosure may be used with many types of environments. The computing environments provided herein are only examples. Each computing environment is capable of being configured to include one or more aspects of the present disclosure. For instance, each may be configured to perform synchronous hardware accelerator interface processing and/or perform one or more other aspects of the present disclosure.

One or more aspects of the present disclosure are tied to computer technology and facilitate processing within a computer, improving performance thereof. For instance, synchronous processing is improved by providing a straightforward mechanism that eliminates the need for dedicated instructions or dedicated message queues. Processing within a processor, computer system and/or computing environment is improved.

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer-readable code into a computing system, in which the code in combination with the computing system is capable of performing one or more embodiments.

Yet a further aspect, a process for integrating computing infrastructure comprising integrating computer-readable code into a computer system may be provided. The computer system comprises a computer-readable medium, in which the computer medium comprises one or more embodiments. The code in combination with the computer system is capable of performing one or more embodiments.

Although various embodiments are described above, these are only examples. For example, other instructions, instruction formats, operands and/or registers may be used. Moreover, additional, less and/or other code may be used. Although code may be provided as an example of performing a particular operation or task, additional and/or other code may be used. Code may be combined and/or separated. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product comprising:

a set of one or more computer-readable storage media; and program instructions, collectively stored in the set of one or more computer-readable storage media, for causing at least one computing device to perform computer operations including:

invoking, during program execution, synchronous operation of an accelerator of a computing environment based on an instruction of the program storing data to be used by the accelerator in a selected location, wherein the selected location is an interface location defined to represent a control interface for the accelerator, and storing the data to the selected location is interpreted as a command to invoke the accelerator rather than a conventional memory write operation, and wherein executing an instruction to store the data in the selected location initiates the accelerator and prevents completion of the instruction until the accelerator finishes a task to be performed by the accelerator, and wherein storing the data to be used by the accelerator stalls the instruction and program execution until the accelerator operation has finished the task such that the instruction returns only after completion of the accelerator operation, and such that the accelerator operation is synchronous to execution of the instruction;

obtaining status of the task performed by the accelerator; and performing at least one action based on obtaining the status of the task performed by the accelerator.

2. The computer program product of claim 1, wherein the selected location is a memory location addressed by a virtual address used by an application to store the data.

3. The computer program product of claim 1, wherein the storing the data in the selected location and the obtaining the status include executing the instruction that atomically performs the storing of the data in the selected location and the obtaining the status.

4. The computer program product of claim 3, wherein the instruction is a compare and swap instruction, and based on executing the compare and swap instruction: the data is stored in the selected location and based on the accelerator performing the task using the data that is stored in the selected location, the status is loaded into another selected location.

5. The computer program product of claim 1, wherein the instruction storing the data in the selected location includes a store instruction to store the data in the selected location, the selected location being a memory location.

6. The computer program product of claim 1, wherein the obtaining the status comprises executing a load instruction to obtain the status.

7. The computer program product of claim 1, wherein the data stored in the selected location includes an address of a parameter block, wherein contents of the parameter block are related to the task to be performed by the accelerator.

8. The computer program product of claim 1, wherein the storing the data includes storing contents of a chosen location in the selected location, the contents of the chosen location including parameter block information to be used by the accelerator to perform the task.

9. The computer program product of claim 8, wherein the chosen location includes a register, the register storing the parameter block information, and wherein the selected location includes a memory location.

10. The computer program product of claim 9, wherein the parameter block information includes contents of a parameter block, the contents of the parameter block being related to the task to be performed by the accelerator.

11. The computer program product of claim 9, wherein the parameter block information includes an address of a parameter block, wherein contents of the parameter block are related to the task to be performed by the accelerator.

12. The computer program product of claim 1, wherein the status includes a failing address, the failing address indicating a page fault.

13. A computer system comprising:

at least one computing device;

a set of one or more computer-readable storage media; and program instructions, collectively stored in the set of one or more computer-readable storage media, for causing the at least one computing device to perform computer operations including:

invoking, during program execution, synchronous operation of an accelerator of a computing environment based on an instruction of the program storing data to be used by the accelerator in a selected location, wherein the selected location is an interface location defined to represent a control interface for the accelerator, and storing the data to the selected location is interpreted as a command to invoke the accelerator rather than a conventional memory write operation, and wherein executing an instruction to store the data in the selected location initiates the accelerator and prevents completion of the instruction until the accelerator finishes a task to be performed by the accelerator, and wherein storing the data to be used by the accelerator stalls the instruction and program execution until the accelerator operation has finished the task such that the instruction returns only after completion of the accelerator operation, and such that the accelerator operation is synchronous to execution of the instruction;

obtaining status of the task performed by the accelerator; and performing at least one action based on obtaining the status of the task performed by the accelerator.

14. The computer system of claim 13, wherein the selected location is a memory location addressed by a virtual address used by an application to store the data.

15. The computer system of claim 13, wherein the storing the data in the selected location and the obtaining the status include executing the instruction that atomically performs the storing of the data in the selected location and the obtaining the status.

16. The computer system of claim 13, wherein the instruction storing the data in the selected location includes a store instruction to store the data in the selected location, the selected location being a memory location, and wherein the obtaining the status comprises executing a load instruction to obtain the status.

17. A computer-implemented method comprising:

invoking, during program execution, synchronous operation of an accelerator of a computing environment based on an instruction of the program storing data to be used by the accelerator in a selected location, wherein the selected location is an interface location defined to represent a control interface for the accelerator, and storing the data to the selected location is interpreted as a command to invoke the accelerator rather than a conventional memory write operation, and wherein executing an instruction to store the data in the selected location initiates the accelerator and prevents completion of the instruction until the accelerator finishes a task to be performed by the accelerator, and wherein storing the data to be used by the accelerator stalls the instruction and program execution until the accelerator operation has finished the task such that the instruction returns only after completion of the accelerator operation, and such that the accelerator operation is synchronous to execution of the instruction;

obtaining status of the task performed by the accelerator; and performing at least one action based on obtaining the status of the task performed by the accelerator.

18. The computer-implemented method of claim 17, wherein the selected location is a memory location addressed by a virtual address used by an application to store the data.

19. The computer-implemented method of claim 17, wherein the storing the data in the selected location and the obtaining the status include executing the instruction that atomically performs the storing of the data in the selected location and the obtaining the status.

20. The computer-implemented method of claim 17, wherein the instruction storing the data in the selected location includes a store instruction to store the data in the selected location, the selected location being a memory location, and wherein the obtaining the status comprises executing a load instruction to obtain the status.

21. A computer program product comprising:

a set of one or more computer-readable storage media; and program instructions, collectively stored in the set of one or more computer-readable storage media, for causing a hardware accelerator to perform computer operations including:

determining, by the hardware accelerator, that it is being invoked by a computing device during program execution, the computing device being coupled to the hardware accelerator, the determining being based on data to be used by the hardware accelerator being stored by an instruction of the program in a selected location, wherein the selected location is an interface location defined to represent a control interface for the accelerator, and storing the data to the selected location is interpreted as a command to invoke the accelerator rather than a conventional memory write operation, and wherein executing an instruction to store the data in the selected location initiates the accelerator and prevents completion of the instruction until the accelerator finishes a task to be performed by the accelerator, and wherein storing the data to be used by the accelerator in the selected location stalls the instruction and program execution until the accelerator operation has finished the task such that the instruction returns only after completion of the accelerator operation, and such that the accelerator operation is synchronous to execution of the instruction;

performing, by the hardware accelerator based on being invoked, the task, the performing the task using the data stored in the selected location; and providing, by the hardware accelerator, status of the task performed by the hardware accelerator.

22. A computer-implemented method comprising:

determining, by a hardware accelerator, that it is being invoked by a computing device during program execution, the computing device being coupled to the hardware accelerator, the determining being based on data to be used by the hardware accelerator being stored by an instruction of the program in a selected location, wherein the selected location is an interface location defined to represent a control interface for the accelerator, and storing the data to the selected location is interpreted as a command to invoke the accelerator rather than a conventional memory write operation, and wherein executing an instruction to store the data in the selected location initiates the accelerator and prevents completion of the instruction until the accelerator finishes a task to be performed by the accelerator, and wherein storing the data to be used by the accelerator in the selected location stalls the instruction and program execution until the accelerator operation has finished the task such that the instruction returns only after completion of the accelerator operation, and such that the accelerator operation is synchronous to execution of the instruction;

performing, by the hardware accelerator based on being invoked, the task, the performing the task using the data stored in the selected location; and providing, by the hardware accelerator, status of the task performed by the hardware accelerator.

23. The computer program product of claim 21, wherein the selected location is a memory location addressed by a virtual address used by an application to store the data.

24. The computer program product of claim 21, wherein the storing the data in the selected location and the providing the status include executing the instruction that atomically performs the storing of the data in the selected location and the providing the status.

25. The computer-implemented method of claim 22, wherein the selected location is a memory location addressed by a virtual address used by an application to store the data.

* * * * *